(12) United States Patent
Brady et al.

(10) Patent No.: US 8,417,192 B2
(45) Date of Patent: Apr. 9, 2013

(54) RADIO FREQUENCY (RF) TRANSCEIVER

(75) Inventors: Vernon T. Brady, Orlando, FL (US); Scott A. Faulkner, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1227 days.

(21) Appl. No.: 12/201,518

(22) Filed: Aug. 29, 2008

(65) Prior Publication Data
US 2010/0056044 A1 Mar. 4, 2010

(51) Int. Cl.
*H04B 1/38* (2006.01)
(52) U.S. Cl.
USPC .......... 455/73; 455/118; 455/190.1; 455/255; 455/313; 455/323
(58) Field of Classification Search ......................... None
See application file for complete search history.

(56) References Cited

U.S. PATENT DOCUMENTS

| | | | |
|---|---|---|---|
| 5,123,008 A * | 6/1992 | Beesley | 370/280 |
| 6,266,010 B1 | 7/2001 | Ammar et al. | |
| 6,442,374 B1 | 8/2002 | Brady et al. | |
| 6,957,047 B1 * | 10/2005 | Young et al. | 455/83 |

* cited by examiner

*Primary Examiner* — Zhiyu Lu
(74) *Attorney, Agent, or Firm* — Withrow & Terranova, PLLC (57) ABSTRACT

Systems and methods are disclosed for transmitting and receiving RF signals. An exemplary RF transceiver includes a signal generator, a frequency multiplier circuit, a receiver circuit, a transmitter circuit, and a switching device. The signal generator is configured to output a first signal and a second signal. The first signal comprises a local oscillator signal, and a frequency of the second signal is derived from a frequency of the first signal. The frequency multiplier circuit is configured to upconvert the output of the signal generator by frequency multiplication. The receiver circuit is configured to process a received signal using an upconverted first signal, and the transmitter circuit is configured to provide an upconverted second signal to a transmitter channel. The switching device is configured to provide the upconverted first signal to the receiver circuit and the upconverted second signal to the transmitter circuit.

28 Claims, 4 Drawing Sheets

RADIO FREQUENCY (RF) TRANSCEIVER

BACKGROUND

Radio frequency (RF) transceiver architectures are known, which support applications such as radar, radio, point-to-point data links, and so forth. Known transceiver architectures include circuitry for two RF inputs, such that up-conversion to a higher frequency signal involves mixing circuitry for two RF input signals. Additionally, known transceiver architectures are driven with relatively high frequency signals, such as 10 GHz signals. These higher frequency architectures are used in radar systems, and are implemented with printed circuit board materials and off-gimbal electronics that support operation of the transceiver.

SUMMARY

Systems and methods are disclosed for transmitting and receiving RF signals. An exemplary RF transceiver includes a signal generator, a frequency multiplier circuit, a receiver circuit, a transmitter circuit, and a switching device. The signal generator is configured to output a first signal and a second signal. The first signal comprises a local oscillator signal, and a frequency of the second signal is derived from a frequency of the first signal. The frequency multiplier circuit is configured to upconvert the output of the signal generator by frequency multiplication. The receiver circuit is configured to process a received signal using an upconverted first signal, and the transmitter circuit is configured to provide an upconverted second signal to a transmitter channel. The switching device is configured to provide the upconverted first signal to the receiver circuit and the upconverted second signal to the transmitter circuit.

Another exemplary RF transceiver includes means for generating a first signal and a second signal. The first signal comprises a local oscillator signal, and a frequency of the second signal is derived from a frequency of the first signal. The RF transceiver also includes means for upconverting the generated signals by frequency multiplication, and means for selecting a receiver path or a transmitter path and for providing an upconverted first signal to the receiver path and an upconverted second signal to the transmitter path. The RF transceiver further includes means for processing a received signal using the upconverted first signal when the receiver path is selected, and means for providing the upconverted second signal to a transmitter channel when the transmitter path is selected.

An exemplary method for transmitting and receiving RF signals includes generating a first signal and a second signal. The first signal comprises a local oscillator signal, and a frequency of the second signal is derived from a frequency of the first signal. The method also includes upconverting the generated signals by frequency multiplication, selecting a receiver path or a transmitter path and providing an upconverted first signal to the receiver path and an upconverted second signal to the transmitter path in accordance with the selected path. The method further includes processing a received signal using the upconverted first signal when the receiver path is selected, and providing the upconverted second signal to a transmitter channel when the transmitter path is selected.

BRIEF DESCRIPTION OF THE DRAWINGS

Other objects and advantages of the invention will become apparent to those skilled in the relevant art(s) upon reading the following detailed description of preferred embodiments, in conjunction with the accompanying drawings, in which like reference numerals have been used to designate like elements, and in which.

DETAILED DESCRIPTION

Figure 1A:
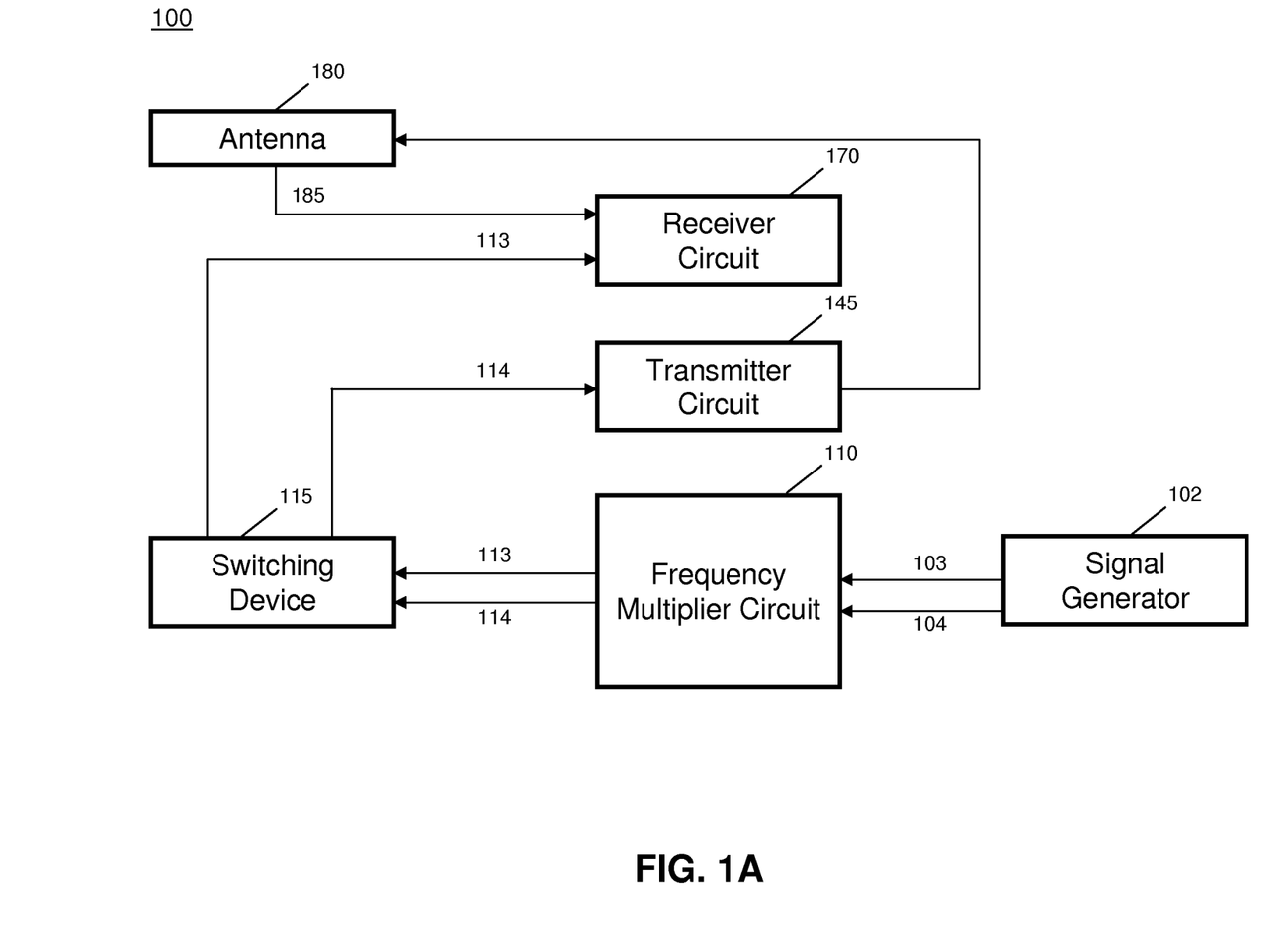
FIG. 1A illustrates a high-level block diagram of a RF transceiver architecture.

FIG. 1A illustrates a high-level block diagram of a RF transceiver 100. The RF transceiver architecture 100, as disclosed herein, can be used in any application involving a transceiver, such as radar, radio, point-to-point data links, and so forth. Exemplary embodiments can support multiple radar modes, including Doppler, high range resolution, Doppler beam sharpening, stretch processing, and synthetic aperture radar without additional cost. An exemplary low-cost RF transceiver architecture for radar and radio applications is described in which techniques are employed to reduce cost, size, weight, and the need for tuning the RF transceiver.

The explanation will be by way of exemplary embodiments to which the present invention is not limited.

As shown in FIG. 1A, RF transceiver 100 includes means for generating a first and a second signal, such as a signal generator 102. RF transceiver 100 also includes means for upconverting the generated signals by frequency multiplication, such as a frequency multiplier circuit 110. Means, such as a switching device 115, are included in RF transceiver 100 for selecting a receiver path or a transmitter path, and for providing an upconverted first signal to the receiver path and an upconverted second signal to the transmitter path. Means, such as a receiver circuit 170, are included for processing a received signal using the upconverted first signal when the receiver path is selected. Means, such as a transmitter circuit 145, are included for providing the upconverted transmit signal to a transmitter channel when the transmitter path is selected. In an embodiment, RF transceiver 100 operates with an antenna 180 for transmitting and receiving signals.

Figure 1B:
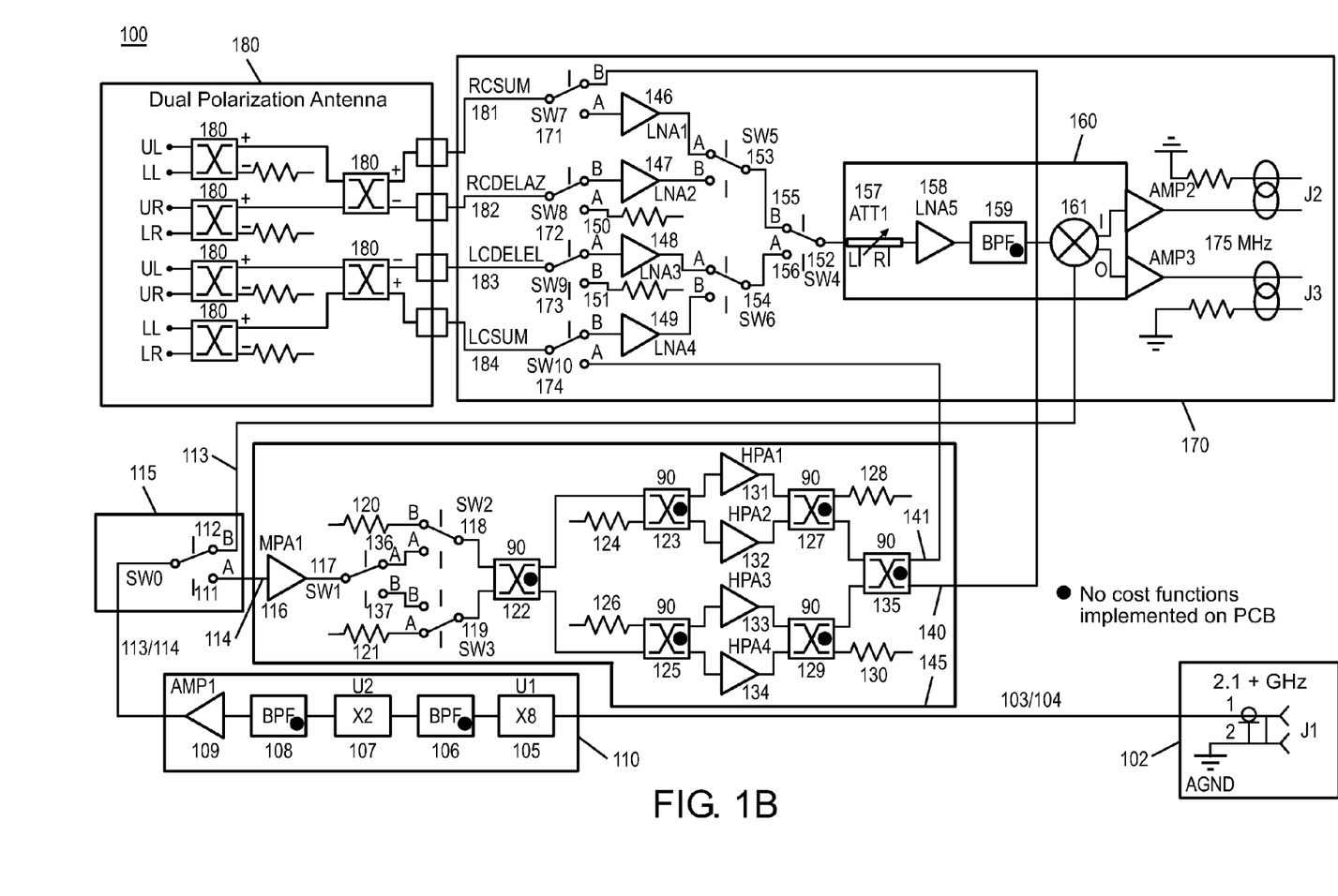
FIG. 1B illustrates an exemplary implementation of the RF transceiver architecture of FIG. 1A.

FIG. 1B illustrates an exemplary implementation of the RF transceiver architecture of FIG. 1A, which can be employed to reduce cost, size, weight, and the need for tuning the RF transceiver. Due to the simplicity of the architecture of the RF transceiver 100 of FIG. 1B, in one embodiment, the RF transceiver 100 can be laid out on a single layer of a low-loss PCB material. Implementation of the RF transceiver 100 as a single layer on a PCB can enable use in high-frequency applications.

As shown in FIG. 1A, the signal generator 102 can be configured to generate a first signal 103 and a second signal 104. In an embodiment, the signal generator 102 can be configured to generate a time-multiplexed signal, which at one time instant comprises the first signal and at another time instant comprises the second signal. In one embodiment, the signal generator 102 can include two signal generators, a first signal generator for generating the first signal 103 and a second signal generator for generating the second signal 104. The first and second signal generators can be coupled to a switching device and phase-locked to a clock so that either the first signal 103 or the second signal 104 can be generated through rapid switching of the switching device between the two signal generators.

In another embodiment, the signal generator 102 can include a variable intermediate frequency (IF) frequency generator. Selection of the IF affects the components that can be used to implement a circuit and the applications for which the circuit can be used (e.g., a higher IF can be selected for applications involving more data). In this embodiment, the first signal 103 can be generated based on a local oscillator (LO) signal of the signal generator 102, and a frequency of the second signal 104 can be derived from a frequency of the first signal 104. For example, a difference between the frequency of the second signal 104 and the frequency of the first signal 103 can correspond to the system IF. In this way, the signal generator 102 can rapidly generate a signal having either the first signal LO frequency or the second signal frequency, which approximates the first signal LO frequency plus the system IF.

In the exemplary implementation of FIG. 1B, the LO frequency is 2.1+ GHz, which is a relatively low frequency RF input signal compared to typical RF transceiver designs. Higher driving frequencies, such as 10 GHz, can involve special printed circuit board (PCB) materials to implement the off-gimbal electronics that support operation of the RF transceiver.

As shown in FIG. 1A, the frequency multiplier circuit 110 can be configured to upconvert the first signal 103 and the second signal 104 by frequency multiplication to generate an upconverted first signal 113 and an upconverted second signal 114. In one embodiment, the frequency multiplier circuit 110 comprises a chain of frequency multipliers to perform the frequency multiplication. For example, as shown in the exemplary implementation of FIG. 1B, the frequency multiplier circuit 110 can comprise a first frequency multiplier 105 coupled between an output of the signal generator 102 and an input of a first band-pass filter 106, a second frequency multiplier 107 coupled between an output of the first band-pass filter 106 and an input of a second band-pass filter 108, and an amplifier 109 coupled between an output of the second band-pass filter 108 and the switching device 115. As indicated in FIG. 1B, the first and second band-pass filters 106 and 108 can be implemented as components etched into a surface of a PCB on which the RF transceiver 100 operates (i.e., these can be implemented as no-cost functions on the PCB).

In the exemplary implementation of FIG. 1B, the frequency multiplier 105 is implemented as a times eight frequency multiplier and the frequency multiplier 107 is implemented as a times two frequency multiplier. In this way, the frequency multiplier circuit 110 upconverts the first and second signals 103 and 104 having frequencies at or above 2.1 GHz to generate upconverted first and second signals 113 and 114 having frequencies in the 33-36 GHz range. Those skilled in the art will understand that the frequency multiplier circuit 110 need not be limited to the configuration shown in FIG. 1B, and that other combinations of frequency multipliers can be used to upconvert the first and second signals 103 and 104 to other frequency ranges. So that the filters 106 and 108 are realizable, the ratio of the frequency multiplier 105 and the frequency multiplier 107 can be lower (e.g., one) or any multiple thereof.

While RF transceivers can employ a chain of frequency up-converters to mix RF signals of different frequencies together to generate a higher frequency RF signal, employing a chain of frequency multipliers to perform the upconversion can be less expensive to implement than a chain of frequency up-converters. For example, by employing a chain of frequency multipliers instead of a chain of frequency up-converters, the exemplary implementation of the RF transceiver 100, shown in FIG. 1B, can employ a single LO instead of multiple LOs. Exemplary small package frequency multiplier chips are commercially available, such as those manufactured by Hittite Microwave Corporation (www.hittite.com). In some embodiments, the RF transceiver 100 can be implemented without the frequency multiplier circuit 110.

As shown in FIG. 1A, the switching device 115 can be configured to provide the upconverted first signal 113 to the receiver circuit 170 and the upconverted second signal 114 to the transmitter circuit 145. In one embodiment, as shown in the exemplary implementation of FIG. 1B, the switching device 115 comprises a single-pole double-throw switch that can be turned on by applying a positive voltage and turned off by applying a negative voltage. In this embodiment, when the switching device 115 is coupled to a first terminal 111, the upconverted second signal 114 is provided to the transmitter circuit 145, and when the switching device 115 is coupled to a second terminal 112, the upconverted first signal 113 is provided to the receiver circuit 170.

As shown in FIG. 1A, the transmitter circuit 145 can be configured to provide the upconverted second signal 114 to a desired transmitter channel of the antenna 180. In one embodiment, the transmitter circuit 145 comprises a plurality of ninety-degree hybrid devices configured to steer the upconverted second signal 114 to the desired transmitter channel. For example, U.S. Pat. No. 6,266,010, which is herein incorporated by reference in its entirety, describes an exemplary steering circuit implemented with hybrid devices.

In the exemplary implementation of FIG. 1B, the transmitter circuit 145 comprises an input hybrid device 122 and an output hybrid device 135, which has a first output 140 coupled to a first transmitter channel 181 and a second output 141 coupled to a second transmitter channel 184. Thus, in this embodiment, the RF transceiver 100 can operate as a dual-channel transmitter. The transmitter circuit 145 can be configured to steer the upconverted second signal 114 to one of the first and second outputs 140 and 141 of the output hybrid device 135 associated with the first and second transmitter channels 181 and 184, respectively.

To this end, the transmitter circuit 145 can comprise a plurality of switching devices 117, 118, and 119 configured to provide the upconverted second signal 114 between first and second inputs of the input hybrid device 122. The transmitter circuit 145 can also comprise a first pair of hybrid devices 123 and 125, each having an input coupled to a respective output of the input hybrid device 122, and a second pair of hybrid devices 127 and 129, each having an output coupled to a respective input of the output hybrid device 135. The transmitter circuit 145 can further comprise at least one amplifier coupled between respective outputs of the first pair of hybrid devices 123 and 125 and respective inputs of the second pair of hybrid devices 127 and 129.

As shown in FIG. 1B, a first switching device 117 can be coupled to the switching device 115 through an amplifier 116 and can toggle between first and second terminals 136 and 137; a second switching device 118 can be coupled to the first input of the input hybrid device 122 and toggle between the first terminal 136 and a load 120; and a third switching device 119 can be coupled to the second input of the input hybrid device 122 and toggle between the second terminal 137 and a load 121. Loads 120 and 121 are shown as resistive loads in the embodiment of FIG. 1B.

As shown in FIG. 1B, the input hybrid device 122, the output hybrid device 135, and the first and second pairs of hybrid devices 123, 125, 127, and 129 can be implemented as ninety-degree hybrid devices. The ninety-degree hybrid devices can be implemented as devices etched into a surface of a PCB on which the RF transceiver 100 operates. Each hybrid device of the first pair of hybrid devices 123 and 125 can have an input coupled to a load 124 and 126, respectively. Similarly, each hybrid device of the second pair of hybrid devices 127 and 129 can have an output coupled to a load 128 and 130, respectively. Loads 124, 126, 128, and 130 are shown as resistive loads in the embodiment of FIG. 1B.

In the embodiment of FIG. 1B, the transmitter circuit 145 includes four high-power amplifiers (HPAs) 131, 132, 133, and 134. For this configuration, coupling the first switching device 117 to the first terminal 136 can steer the energy of the upconverted second signal 114 through the first output 140 of the output hybrid device 135 to the first transmitter channel 181, while coupling the first switching device 117 to the second terminal 137 can steer the energy of the upconverted second signal 114 through the second output 141 of the output hybrid device 135 to the second transmitter channel 184. Those skilled in the art will understand that the transmitter circuit 145 can be implemented using other quantities of HPAs, such as eight, six, two HPAs or even one HPA. In the case of one HPA, the first switching device 117 can be eliminated and the output hybrid device 135 can be replaced with a switching device.

As shown in FIG. 1A, the receiver circuit 170 can be configured to process a received signal 185 using the upconverted first signal 113. In one embodiment, the receiver circuit 170 can be configured to down-convert the carrier frequency of the received signal 185. In the exemplary implementation of FIG. 1B, the receiver circuit 170 comprises a plurality of amplifiers, each amplifier associated with a receiver channel, a plurality of switching devices configured to toggle between respective outputs of the amplifiers to select an associated receiver channel, and a mixer circuit 160 configured to combine the received signal 185 from the receiver channel with the upconverted first signal 113 to generate the received signal having the down-converted carrier frequency (e.g., 175 MHz in this example).

As shown in FIG. 1B, the plurality of amplifiers can include first, second, third, and fourth amplifiers 146, 147, 148, and 149, respectively. Amplifiers 146-149 can be implemented with low noise amplifiers (LNAs) to improve the noise figure of the RF transceiver 100. As shown in FIG. 1B, the first amplifier 146 is associated with a first receiver channel 181, the second amplifier 147 with a first transmitter/receiver channel 182, the third amplifier 148 with a second transmitter/receiver channel 183, and the fourth amplifier 149 with a second receiver channel 184.

In one embodiment, the receiver circuit 170 can include at least one switching device configured to select between the receiver channels. As shown in the exemplary implementation of FIG. 1B, the receiver circuit 170 comprises a fourth switching device 152 coupled to the mixer circuit 160 and configured to toggle between first and second terminals 155 and 156, respectively, a fifth switching device 153 coupled to the first terminal 155 and configured to toggle between respective outputs of the first and second amplifiers 146 and 147, and a sixth switching device 154 coupled to the second terminal 156 and configured to toggle between respective outputs of the third and fourth amplifiers 148 and 149. In this way, the receiver circuit 170 can select one of the receiver channels 181-184.

In one embodiment, as shown in FIG. 1B, the mixer circuit 160 includes a single stage in-phase/quadrature phase (I/Q) mixer 161. The I/Q mixer 161 can be configured as a front-end of an image rejection mixer implemented in the off-gimbal electronics. RF transceivers can be implemented with one I/Q mixer for each LO (e.g., three LOs, three mixers, three down-conversions). Thus, because RF transceiver 100 is driven by one LO, only one I/Q mixer 161 need be implemented to perform one down-conversion, thereby reducing the complexity and the cost of implementing the RF transceiver 100. In one embodiment, the I/Q mixer 161 can be implemented as the front end to a Weaver image rejection mixer.

As shown in FIG. 1B, the mixer circuit 160 also comprises an attenuator 157 coupled between the fourth switching device 152 and an input of a low-noise amplifier 158, and a band-pass filter 159 coupled between an output of the low-noise amplifier 158 and an input of the I/Q mixer 161. Thus, the attenuator 157, the low-noise amplifier 158, and the band-pass filter 159 process the received signal 185, and the I/Q mixer 161 combines the processed received signal with the upconverted first signal 113 to generate the down-converted received signal. The attenuator 157 can be employed to reduce the dynamic range of downstream component hardware. As indicated in FIG. 1B, the band-pass filter 159 can be implemented as a component etched into the surface of the PCB on which the RF transceiver 100 operates.

In one embodiment, the RF transceiver 100 comprises a plurality of switching devices coupled to a plurality of antenna channels. For example, as shown in FIG. 1B, the channels of antenna 180 include the first and second transmitter/receiver channels 181 and 184, respectively, and the first and second receiver channels 182 and 183, respectively. The switching devices include a seventh switching device 171 coupled to the first transmitter/receiver channel 181 and configured to toggle between the first output 140 of the output hybrid device 135 and an input of the first amplifier 146 of the receiver circuit 170; an eighth switching device 172 coupled to the first receiver channel 182 and configured to toggle between an input of the second amplifier 147 of the receiver circuit 170 and a load 150; a ninth switching device 173 coupled to the second receiver channel 183 and configured to toggle between an input of the third amplifier 148 of the receiver circuit 170 and a load 151; and a tenth switching device 174 coupled to the second transmitter/receiver channel 184 and configured to toggle between the second output 141 of the output hybrid device 135 and an input of the fourth amplifier 149 of the receiver circuit 170.

While not a component of the RF transceiver 100, the antenna 180 is also shown in FIG. 1B. In this implementation, the antenna 180 is configured with dual polarization and the antenna channels include left circularly polarized channels and right circularly polarized channels. As shown in the exemplary implementation of FIG. 1B, the first transmitter/receiver channel 181 is right circularly polarized (i.e., RCSUM), the second transmitter/receiver channel 184 is left circularly polarized (i.e., LCSUM), the first receiver channel 182 is right circularly polarized (i.e., RCDELAZ), and the second receiver channel 183 is left circularly polarized (i.e., LCDELEL). Those skilled in the art will understand that the RF transceiver 100 need not be limited to operating with a four-channel, dual-polarization antenna, and that other types antennas with different channel configurations (e.g., bistatic, monostatic, etc.) can be used to transmit and receive RF signals.

Figure 3:
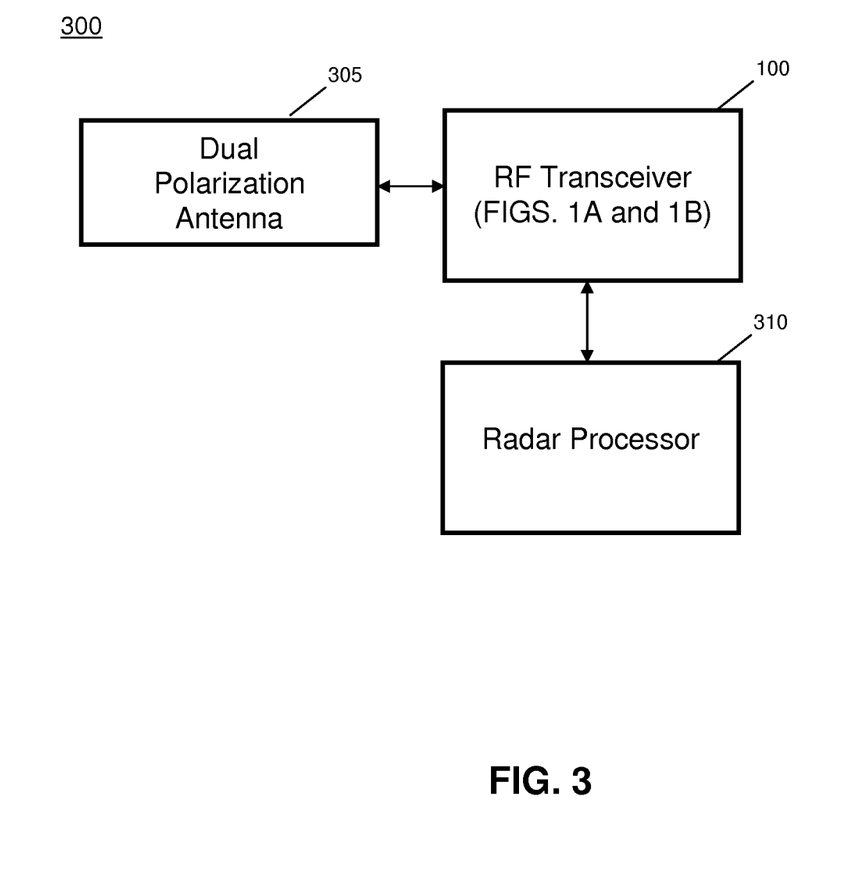
FIG. 3 illustrates a high-level block diagram of an exemplary radar system including the RF transceiver shown in FIGS. 1A and 1B.

The RF transceiver 100, shown in FIGS. 1A and 1B, can be used in any application involving a transceiver such as radar, radio, and point-to-point data links, and can support multiple radar modes, including Doppler, high range resolution, Doppler beam sharpening, stretch processing, synthetic aperture radar, and so forth. For example, FIG. 3 illustrates a high-level block diagram of an exemplary radar system 300 in which the RF transceiver 100 is employed in combination with an antenna 305, which is configured to transmit and receive RF signals, and a radar processor 310, which is configured to process the RF signals.

Figure 2:
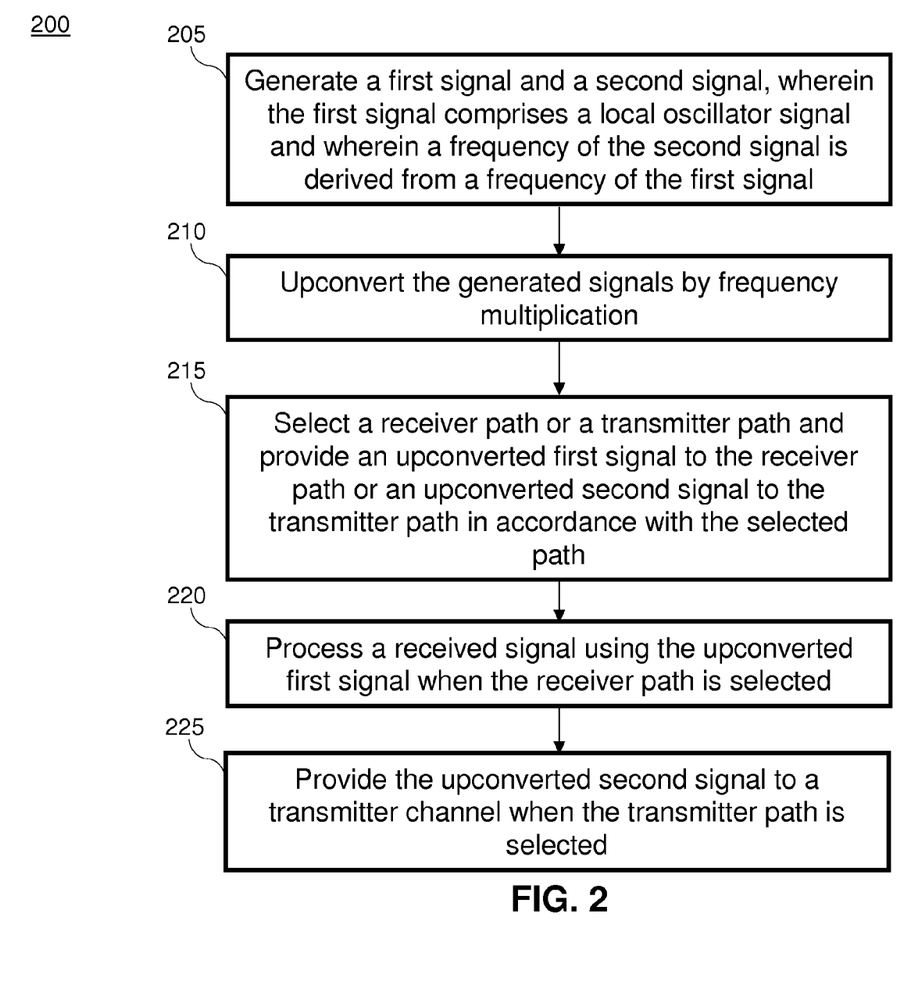
FIG. 2 illustrates an exemplary method for transmitting and receiving RF signals.

FIG. 2 illustrates a method 200 for transmitting and receiving RF signals in accordance with exemplary embodiments. Not all of the steps of FIG. 2 have to occur in the order shown, as will be apparent to those skilled in the art based on the teachings herein. Other operational and structural embodiments will be apparent to those skilled in the art based on the following discussion. These steps are described in detail below.

In step 205, a first signal and a second signal are generated. For example, the signals can be generated by employing the signal generator 102, shown in FIGS. 1A and 1B. The first signal comprises a local oscillator signal, and a frequency of the second signal is derived from a frequency of the first signal.

In step 210, the generated signals are upconverted by frequency multiplication. For example, the multiplying can be accomplished by employing the frequency multiplier circuit 110, shown in FIG. 1B, which includes a chain of frequency multipliers 105 and 107 for multiplying the first and second signals 103 and 104.

In step 215, a receiver path or a transmitter path is selected and an upconverted first signal is provided to the receiver path or an upconverted second signal is provided to the transmitter path in accordance with the selected path in accordance with the selected path. For example, the selecting and the providing can be accomplished by employing the switching device 115, shown in FIG. 1B. When the switching device 115 is coupled to the first terminal 111, the transmitter circuit 145 is selected and the upconverted second signal 114 is provided, and when the switching device 115 is coupled to the second terminal 112, the receiver circuit 170 is selected and the upconverted first signal 113 is provided.

In step 220, a received signal is processed using the upconverted first signal when the receiver path is selected. For example, the processing can be accomplished by employing the receiver circuit 170, shown in FIG. 1B. In one embodiment, step 220 comprises selecting a receiver channel and combining the received signal from the receiver channel with the upconverted first signal. For example, when the receiver circuit 170 is employed, the fourth switching device 152, the fifth switching device 153, and the sixth switching device 154 are configured to select one of the amplifier outputs associated with one of the receiver channels 181-184, and the mixer circuit 160 is configured to combine the received signal 185 with the upconverted first signal 113 to generate the received signal having the down-converted carrier frequency. In one embodiment, the combining comprises down-converting the carrier frequency of the received signal using a single stage in-phase/quadrature phase (I/Q) mixer. For example, the single stage I/Q mixer 161, shown in FIG. 1B, can be employed to accomplish the down-conversion of the received signal 185 in a single stage.

In step 225, the upconverted second signal is provided to a transmitter channel when the transmitter path is selected. For example, the providing can be accomplished by employing the transmitter circuit 145, shown in FIG. 1B. In one embodiment, step 225 comprises steering the upconverted second signal to one of two transmitter channels using a plurality of ninety-degree hybrid devices. For example, when the transmitter circuit 145 is employed, coupling the first switching device 117 to the first terminal 136 can steer the energy of the upconverted second signal 114 through the first output 140 of the output hybrid device 135 to the first transmitter channel 181, while coupling the first switching device 117 to the second terminal 137 can steer the energy of the upconverted second signal through the second output 141 of the output hybrid device 135 to the second transmitter channel 184.

The present invention has been described with reference to several exemplary embodiments, however, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A radio frequency (RF) transceiver, comprising:
a signal generator configured to output a first signal and a second signal, wherein the first signal comprises a local oscillator signal and a frequency of the second signal is derived from a frequency of the first signal;
a frequency multiplier circuit configured to upconvert the first and second signals output by the generator by frequency multiplication, and to output an upconverted first signal and an upconverted second signal as separate signals;
a receiver circuit configured to process a received signal using the upconverted first signal;
a transmitter circuit configured to provide the upconverted second signal to a transmitter channel; and
a switching device configured to provide the upconverted first signal to the receiver circuit and the upconverted second signal to the transmitter circuit,
wherein the transmitter circuit comprises:
an input hybrid device;
an output hybrid device having a first output coupled to a first transmitter channel and a second output coupled to a second transmitter channel;
a plurality of switches configured to provide the upconverted transmit signal between first and second inputs of the input hybrid device;
a first pair of hybrid devices, each having an input coupled to a respective output of the input hybrid device;
a second pair of hybrid devices, each having an output coupled to a respective input of the output hybrid device; and
at least one amplifier coupled between respective outputs of the first pair of hybrid devices and respective inputs of the second pair of hybrid devices,
wherein the transmitter circuit is configured to provide the upconverted second signal to one of the first and second outputs of the output hybrid device.

2. The RF transceiver of claim 1, wherein a difference between the frequency of the second signal and the frequency of the first signal approximates an intermediate frequency (IF) of the transceiver.

3. The RF transceiver of claim 1, wherein the output of the signal generator comprises a time-multiplexed signal.

4. The RF transceiver of claim 1, wherein the frequency multiplier circuit comprises a plurality of frequency multiplier devices.

5. The RF transceiver of claim 1, wherein the frequency multiplier circuit comprises:
a first frequency multiplier coupled between the output of the signal generator and an input of a first band-pass filter;

a second frequency multiplier coupled between an output of the first band-pass filter and an input of a second band-pass filter; and an amplifier coupled between an output of the second band-pass filter and the switching device.

6. The RF transceiver of claim 1, wherein the plurality of switches comprises:
a first switching device coupled to the switching device through an amplifier and configured to provide between first and second terminals;
a second switching device coupled to the first input of the input hybrid device and configured to provide between the first terminal and a load; and
a third switching device coupled to the second input of the input hybrid device and configured to provide between the second terminal and a load.

7. The RF transceiver of claim 1, wherein the input hybrid device, the output hybrid device, and the first and second pairs of hybrid devices include ninety-degree hybrid devices.

8. The RF transceiver of claim 7, wherein the ninety-degree hybrid devices are implemented as devices etched into a surface of a printed circuit board.

9. The RF transceiver of claim 1, wherein each hybrid device of the first pair of hybrid devices has an input coupled to a load.

10. The RF transceiver of claim 1, wherein each hybrid device of the second pair of hybrid devices has an output coupled to a load.

11. The RF transceiver of claim 1, wherein the at least one amplifier includes four high-power amplifiers.

12. The RF transceiver of claim 1, wherein the receiver circuit is configured to down-convert a carrier frequency of the received signal.

13. The RF transceiver of claim 12, wherein the receiver circuit comprises:
a plurality of amplifiers, each amplifier associated with a receiver channel;
a plurality of switches configured to switching device between respective outputs of the amplifiers to select an associated receiver channel; and
a mixer circuit configured to combine the received signal from the selected receiver channel with the upconverted first signal to generate a received signal having a down-converted carrier frequency.

14. The RF transceiver of claim 13, wherein the mixer circuit includes a single stage in-phase/quadrature phase (I/Q) mixer.

15. The RF transceiver of claim 14, wherein the I/Q mixer is configured as a front-end of an image rejection mixer implemented in off-gimbal electronics.

16. The RF transceiver of claim 13, wherein the mixer circuit comprises:
an attenuator coupled between the fourth switching device and an input of a low-noise amplifier; and
a band-pass filter coupled between an output of the low-noise amplifier and an input of the I/Q mixer,
wherein the I/Q mixer combines the received signal processed by the attenuator, the low-noise amplifier, and the band-pass filter with the upconverted receive signal to generate the received signal having the down-converted carrier frequency.

17. The RF transceiver of claim 1, wherein the RF transceiver comprises:
a plurality of switches coupled to a plurality of antenna channels.

18. The RF transceiver of claim 17, wherein the antenna channels includes first and second transmitter/receiver channels and first and second receiver channels.

19. The RF transceiver of claim 18, wherein the plurality of switches comprises:
a seventh switching device coupled to the first transmitter/receiver channel and configured to toggle between the first output of the output hybrid device and a first input of the receiver circuit; an
eighth switching device coupled to the first receiver channel and configured to toggle between a second input of the receiver circuit and a load;
a ninth switching device coupled to the second receiver channel and configured to toggle between a third input of the receiver circuit and a load; and
a tenth switching device coupled to the second transmitter/receiver channel and configured to toggle between the second output of the output hybrid device and a fourth input of the receiver circuit.

20. The RF transceiver of claim 18, wherein the antenna channels include left circularly polarized channels and right circularly polarized channels.

21. The RF transceiver of claim 1 in combination with a radar system, comprising:
an antenna configured to transmit and receive RF signals; and
a processor configured to process the RF signals.

22. The RF transceiver of claim 1, wherein the RF transceiver is implemented as a single layer on a printed circuit board.

23. A radio frequency (RF) transceiver, comprising:
means for generating a first signal and a second signal, wherein the first signal comprises a local oscillator signal and wherein a frequency of the second signal is derived from a frequency of the first signal;
means for upconverting the generated first and second signals by frequency multiplication, and for outputting an upconverted first signal and an upconverted second signal as separate signals;
means for selecting a receiver path or a transmitter path and for providing the upconverted first signal to the receiver path and the upconverted second signal to the transmitter path in accordance with the selected path;
means for processing a received signal using the upconverted first signal when the receiver path is selected; and
means for providing the upconverted second signal to a transmitter channel when the transmitter path is selected,
wherein the means for providing the upconverted second signal comprise:
an input hybrid device;
an output hybrid device having a first output coupled to a first transmitter channel and a second output coupled to a second transmitter channel;
a plurality of switches configured to provide the upconverted transmit signal between first and second inputs of the input hybrid device;
a first pair of hybrid devices, each having an input coupled to a respective output of the input hybrid device;
a second pair of hybrid devices, each having an output coupled to a respective input of the output hybrid device; and
at least one amplifier coupled between respective outputs of the first pair of hybrid devices and respective inputs of the second pair of hybrid devices, wherein the transmitter circuit is configured to provide the upconverted second signal to one of the first and second outputs of the output hybrid device.

24. A method for transmitting and receiving radio frequency (RF) signals, comprising:
  generating a first signal and a second signal, wherein the first signal comprises a local oscillator signal and wherein a frequency of the second signal is derived from a frequency of the first signal;
  upconverting the generated first and second signals by frequency multiplication, and outputting an upconverted first signal and an upconverted second signal as separate signals;
  selecting a receiver path or a transmitter path, and providing the upconverted first signal to the receiver path or the upconverted second signal to the transmitter path in accordance with the selected path;
  processing a received signal using the upconverted first signal; and
  providing the upconverted second signal to a transmitter channel,
  wherein the providing of the upconverted second signal to a transmitter channel comprises:
    providing the upconverted second signal to a transmitter circuit comprising:
      an input hybrid device;
      an output hybrid device having a first output coupled to a first transmitter channel and a second output coupled to a second transmitter channel;
      a plurality of switches configured to provide the upconverted transmit signal between first and second inputs of the input hybrid device;
      a first pair of hybrid devices, each having an input coupled to a respective output of the input hybrid device;
      a second pair of hybrid devices, each having an output coupled to a respective input of the output hybrid device; and
      at least one amplifier coupled between respective outputs of the first pair of hybrid devices and respective inputs of the second pair of hybrid devices,
    wherein the transmitter circuit is configured to provide the upconverted second signal to one of the first and second outputs of the output hybrid device.

25. The method of claim 24, wherein a difference between the frequency of the second signal and the frequency of the first signal approximates an intermediate frequency (IF) of the transceiver.

26. The method of claim 24, wherein generating the first signal and the second signal comprises:
  generating a time-multiplexed signal based on the first signal and second signal.

27. The method of claim 24, wherein processing a received signal comprises:
  selecting a receiver channel; and
  combining the received signal from the receiver channel with the upconverted first signal.

28. The method of claim 27, wherein the combining comprises:
  down-converting a carrier frequency of the received signal using a single stage in-phase/quadrature phase (I/Q) mixer.

* * * * *